Aug. 24, 1965 H. T. PRIOR 3,202,928

SIGNAL TRANSMISSION APPARATUS WITH MEANS FOR SUPPRESSING HARMONICS AND INTERMODULATING PRODUCTS

Filed March 5, 1962

Inventor
H. T. PRIOR
By [signature]
Attorney

United States Patent Office 3,202,928

Patented Aug. 24, 1965

3,202,928

SIGNAL TRANSMISSION APPARATUS WITH MEANS FOR SUPPRESSING HARMONICS AND INTERMODULATING PRODUCTS

Hector Thomas Prior, London, England, assignor to International Standard Electric Corporation, New York, N.Y., a corporation of Delaware Filed Mar. 5, 1962, Ser. No. 177,516
Claims priority, application Great Britain, Mar. 14, 1961, 9,305/61
4 Claims. (Cl. 330—124)

This invention relates to the improvement of signal quality in signal transmission apparatus.

It is often important to minimize the level of harmonics and intermodulation products produced in a piece of signal transmission apparatus for a given signal level. This is especially so in the case of apparatus such as multichannel telephone repeaters, as owing to the considerable distances sometimes traversed by cables and consequently the large number of repeaters required to handle the signal, the intermodulation noise generated by the apparatus is a limiting factor. The most important techniques used for this purpose are negative feedback in amplifiers, and push-pull arrangements. Negative feedback affects all types of harmonics and intermodulation products, whereas push-pull only improves even ordered products.

According to the invention, signal transmission apparatus includes means for deriving from an input signal a plurality of signal components each corresponding to the input signal, said signal components being in phase with one another, individually amplifying each signal component, attenuating one or more of the amplified signal components, reversing the phase of one or more of the amplified and attenuated signal components, re-combining the signal components so that intermodulation and harmonic voltages in the signal components of each phase add up to the same values and cancel out on recombination of the signal components, and the fundamental signal voltages in the signal components of each phase add up to the different values and do not cancel out on re-combination of the signal components.

Alternatively, according to the invention, signal transmission apparatus includes means for deriving a first signal component and a second signal component from the input signal, said signal components corresponding to the input signal and being in phase with one another, means for attenuating the first signal component, means for amplifying both signal components by the same factors, means for attenuating the second signal component after amplification by an amount equal to $n$ times the attenuation of the first component where the $n$th harmonic is to be removed, means for reversing the phase of the second component and means for recombining the two signal components.

In order that the invention may be more clearly understood, preferred forms of the invention are now described with reference to the accompanying drawings in which.

Figure 1:
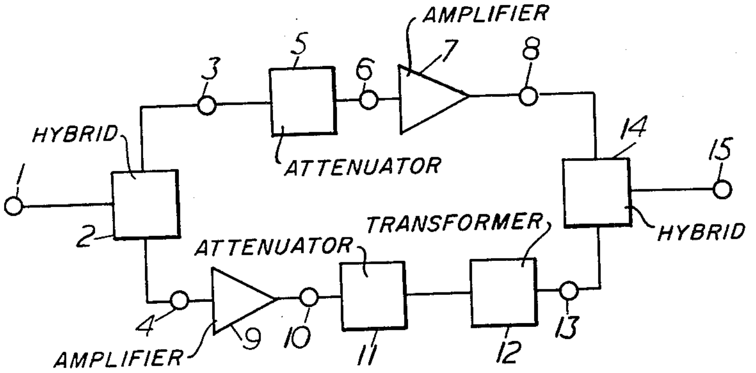
FIG. 1 is a block diagram of one form of repeater unit.

In FIG. 1 the incoming signal 1 is fed into an equal ratio hybrid coil 2, which produces equal signal voltages at 3 and 4. The signal voltage at 3 passes through an attenuating circuit 5, and the attenuated signal 6 is then amplified by the amplifier 7. The other signal voltage 4 is first amplified by an amplifier 9 which is identical to the amplifier 7. The amplified signal 10 is then attenuated in an attenuating circuit 11 which has $n$ times the loss of the attenuator 5. The resultant signal voltage is then passed into a 1:1 transformer 12 of zero loss, the output 13 of which is connected to an equal ratio hybrid coil 14 together with the resultant signal voltage 8, the signal 13 being connected from the transformer 12 so that its phase is reversed, the signals 8 and 13 being re-combined in the hybrid coil 14 to produce the resultant signal 15.

Since the hybrid coil 2 has equal ratios, the signal voltages 3 and 4 are equal. The signal voltage at 4 will be greater than that at 6 by an amount equal to the loss of the attenuator 5. Therefore the voltage of the $n$th harmonic at 10 will be greater than the $n$th harmonic voltage at 8 by $n$ times the loss of the attenuator 5 (this assumes that the amplifiers 7 and 9 are both being operated at levels sufficiently distant from the crash-point).

If the attenuator 11 has $n$ times the loss of attenuator 5, the harmonic voltage at the point 13 will be equal to the harmonic voltage at the point 8. If the transformer 12 is connected to produce cancellation of these harmonic voltages when they re-combine in the hybrid coil 14, the $n$th harmonic will disappear from the signal 15.

If the attenuator 5 has a loss of L db, the attenuator 11 will have a loss of $n$L db and the signal voltage at the point 13 will be less than the signal voltage at the point 8 by $(n-1)$ L db. The signal voltages will not cancel out and the signal 15 will be free of the $n$th harmonic.

Since push-pull provides efficient suppression of even order products the main application of the invention is to odd order products. In repeater amplifiers, for example the third order products are often a limiting factor. Therefore cancellation of these products will occur when $n=3$, i.e. when the attenuator 11 has three times the loss of attenuator 5.

For example, let attenuator 5 have a loss of 3 db and attenuator 11 a loss of 9 db. Then if the signal voltage at 8 is V, the signal voltage at 13 will be at a level of $9-3=6$ db less than V, i.e. ½ V. Thus the combined signal voltages at 15 will be $V-\frac{1}{2}V=\frac{1}{2}V$.

In another example, if attenuator 5 has a loss of 6 db and attenuator 11 has a loss of 18 db, the resultant signal voltage will be $V-\frac{1}{4}V=\frac{3}{4}V$ at the point 15.

In the arrangement just described the loss of the hybrid coil 2 and the attenuator 5 would make the thermal noise at 6 worse than at 1. The loss of the hybrid coil 13 would also decrease the signal level at 15 thus increasing the thermal noise at the input to the next repeater. These difficulties are largely removed by the arrangement shown in FIG. 2, where the signal 16 is amplified first by an amplifier 17 which makes a negligible contribution to intermodulation. The amplified signal 18 is passed into a hybrid coil 19 with equal ratios and one of the resultant equal signal voltages 20 and 21, i.e. the signal voltage 21 is passed through an amplifier 23 which has the same gain at all frequencies. The signal voltages 20 and 24 are then amplified in identical amplifiers 22 and 25, and the output from amplifier 25 is then inverted in a lossless 1:1 transformer 26. The resulting voltages 27 and 28 are re-combined in the hybrid coil 29 which has unequal ratios and which presents its greater loss to the voltage 28.

In this circuit the signal voltages 20 and 21 are equal. The signal level 24 is higher than the signal level 20 by the gain of amplifier 23. Since amplifiers 22 and 25 are identical, the third order intermodulation level at 28 is higher than that at 27 by three times the gain of amplifier 23. To produce cancellation of the third order products the hybrid coil 29 must present a loss to the voltage 28 of three times that which it presents to the voltage 27.

Figure 2:
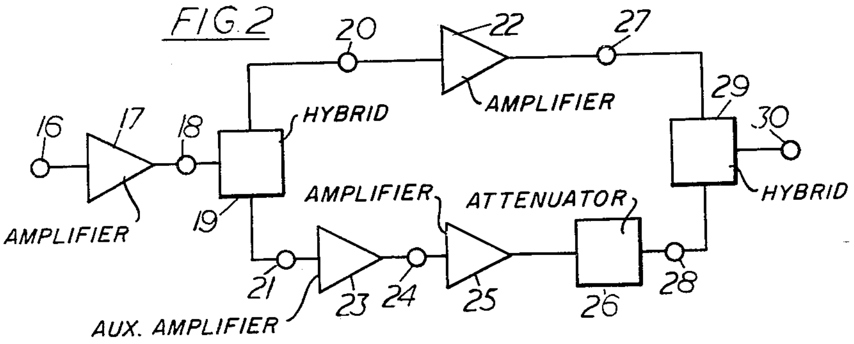
FIG. 2 is a block diagram of an alternative form of repeater unit.
Figure 3:
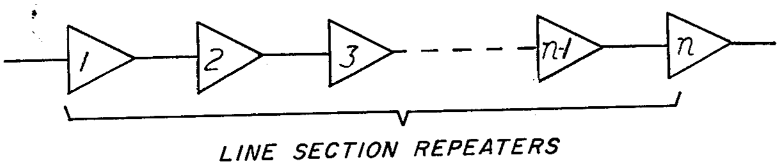
FIG. 3 is a block diagram of a series of repeater units in a transmission line.

Although the arrangement of FIG. 2 gives considerable improvement in signal quality, it also requires approximately double the number of components if it is applied to each repeater. In FIG. 3 there is shown a line having $n$ repeaters. In this case all the repeaters except the last one are normal repeaters. The last, or $n$th, repeater operates on the principles described with reference to FIG. 2. In this case the $n$th repeater is so arranged that it produces a third order product of sufficient magnitude to cancel the whole of the third order products from the preceding $(n-1)$ repeaters.

It is to be understood that the foregoing description of specific examples of this invention is not to be considered as a limitation on its scope.

What I claim is:

1. Signal transmission apparatus for minimizing the level of harmonics and intermodulation products in transmitted incoming signals comprising, input means for deriving a plurality of in-phase signal components from said incoming signals, substantially identical means for amplifying respective ones of said signal components, means for attenuating at least one of said amplified signal components, means for thereafter reversing the phase of at least one of the said amplified and attenuated signal components, and means for combining the amplified phase-reversed and attenuated signal components with the amplified non-phase-shifted signal components to cancel the intermodulation and harmonic voltages of said signal components and to pass the fundamental signal voltages of said incoming signals.

2. Signal transmission apparatus for minimizing the level of haromnics and intermodulation products in transmitted incoming signals comprising, input means for deriving a first signal component and a second signal component from the incoming signal, said signal components corresponding to the incoming signal and being in phase with one another, means for attenuating the said first signal component, amplifier means for amplifying both signal components by the same factors, means for attenuating the amplified second signal component by an amount equal to $n$ times the attenuation of the first component, means for reversing the phase of the amplified and attenuated second component, and means for combining the amplified and attenuated second signal component with the phase-reversed, amplified and attenuated first signal component, to cancel the intermodulation and harmonic voltages and to pass the fundamental signal voltages of said incoming signal.

3. Signal transmission apparatus according to claim 1 wherein auxiliary amplifier means is provided for amplifying all frequencies of the first signal component by the same amount, and wherein the said means for combining includes means for combining the first and second signal components in unequal ratios with the ratio of the loss of the first signal component to that of the second signal component during said combining being $n$ times the amplification of the first component when the $n$th harmonic is to be cancelled.

4. A signal transmission line including a plurality of sections each having $n$ repeater stages in which the $n$th repeater comprises the signal transmission apparatus of claim 1, wherein the third order product produced therein is of sufficient magnitude to cancel the whole of the third order products from the preceding $(n-1)$ repeaters and wherein auxiliary amplifier means is included in the said first repeater of said section to compensate for the loss in the signal voltage caused by the $n$th repeater of the previous section of the line.

References Cited by the Examiner

UNITED STATES PATENTS 2,236,134 3/41 Gloess ............. 328—165 X

ROY LAKE, *Primary Examiner.*